US006871298B1

(12) United States Patent
Cavanaugh et al.

(10) Patent No.: US 6,871,298 B1
(45) Date of Patent: Mar. 22, 2005

(54) METHOD AND APPARATUS THAT SIMULATES THE EXECUTION OF PARALLEL INSTRUCTIONS IN PROCESSOR FUNCTIONAL VERIFICATION TESTING

(75) Inventors: Becky Cavanaugh, Austin, TX (US); Robert Douglas Gowin, Jr., Austin, TX (US); Eric T. Hennenhoefer, Austin, TX (US)

(73) Assignee: Obsidian Software, Inc., Austin, TX (US)

( * ) Notice: Subject to any disclaimer, the term of this patent is extended or adjusted under 35 U.S.C. 154(b) by 691 days.

(21) Appl. No.: 09/710,057

(22) Filed: Nov. 10, 2000

Related U.S. Application Data
(60) Provisional application No. 60/165,204, filed on Nov. 12, 1999.

(51) Int. Cl.[7] .............................................. G06F 11/263
(52) U.S. Cl. .............................. 714/33; 714/28; 714/30; 712/227
(58) Field of Search .............................. 714/33, 10, 30, 714/28, 37; 716/4, 5; 703/15; 712/226, 227

(56) References Cited

U.S. PATENT DOCUMENTS

| | | | |
|---|---|---|---|
| 5,202,889 A | | 4/1993 | Aharon et al. |
| 5,448,746 A | | 9/1995 | Eickemeyer et al. |
| 5,774,358 A | * | 6/1998 | Shrote .......................... 700/86 |
| 5,805,470 A | | 9/1998 | Averill |
| 5,920,489 A | * | 7/1999 | Dibrino et al. ................. 716/2 |
| 5,983,335 A | | 11/1999 | Dwyer, III |
| 6,170,078 B1 | * | 1/2001 | Erle et al. ....................... 716/4 |
| 6,212,667 B1 | * | 4/2001 | Geer et al. ....................... 716/6 |
| 6,216,218 B1 | * | 4/2001 | Sollars .......................... 712/201 |
| 6,457,173 B1 | * | 9/2002 | Gupta et al. ................. 717/149 |
| 6,484,135 B1 | * | 11/2002 | Chin et al. ..................... 703/23 |
| 6,618,853 B1 | * | 9/2003 | Ohyama et al. ............ 717/109 |

OTHER PUBLICATIONS

Park, et al., Evaluation of Scheduling Techniques on a SPARC–Based VLIW Testbed, Proceedings of the 30th Annual International Symposium on Microarchitecture, Dec. 1997.

Moreno, et al., Simulation/evaluation environment for a VLIW processor architecture, IBM Journal of Research and Development, vol. 41, No. 3 Received Aug. 8, 1996; accepted for publication Mar. 18, 1997.

Lichenstein, et al., Model Based Test Generation for Processor Design Verification, Sixth Innovative Applications of Artificial Intelligence Conference, Aug. 1994.

Lichenstein, et al., Test Program Generation for Functional Verification of PowerPC processors in IBM, IEEE/ACM 32'nd Design Automation Conference, Jun. 1995.

Aharon, et al., Verification of the IBM RISC System/6000 by a dynamic biased pseudo–random test program generator, published in IBM Systems Journal, vol. 30, No. 4, 1991.

(List continued on next page.)

*Primary Examiner*—Scott Baderman
*Assistant Examiner*—Anne L. Damiano
(74) *Attorney, Agent, or Firm*—Baker Botts L.L.P.

(57) ABSTRACT

A dynamic test generation method and apparatus enabling verification of the parallel instruction execution capabilities of VLIW processor systems is described. The test generator includes a user preference queue, a rules table, plurality of resource-related data structures, an instruction packer, and an instruction generator and simulator. The present invention generates a test by selecting instructions for parallel execution based upon resource availability as indicated by the resource-related data structures and the processor's instruction grouping rules, simulating the parallel execution of the instructions on a golden model, updating the resource-related data structures, and evaluating the updated architectural state of the golden model.

30 Claims, 5 Drawing Sheets

OTHER PUBLICATIONS

Casaubieilh, et al., Functional verification methodology of Chameleon processor, presented at the 33rd Annual ACM IEEE Design Automation Conference, Jun. 3–7, 1996.

Bellon, et al., Automatic Generation of Microprocessor Test Programs, presented at ACM IEEE Nineteenth Design Automation Conference Proceedings, Jun., 1982.

Anderson, Logical Verification of the NVAX CPU Chip Design, Digital Technical Journal of Digital Equipment Corporation, vol. 4, No. 3, Summer 1992.

Chandra, et al., Constraint Solving for Test Case Generation—A Technique for High Level Design Verification, published in: International Conference on Computer Design: VLSI in Computers and Processors, Proceedings. Los Alamitos, IEEE Computer Society Press, 1992.

Logan, et al., Directions in Multiprocessor Verification, presented at the 14th Annual IEEE International Phoenix Conference on Computers and Communications, Mar., 1995.

Raghavan, et al., Multiprocessor System Verification Through Behavioral Modeling and Simulation, presented at the 14th Annual IEEE International Phoenix Conference on Computers and Communications, Mar., 1995.

Saha, et al., A Simulation–Based Approach to Architectural Verification of Multiprocessor Systems, presented at the 14th Annual IEEE International Phoenix Conference on Computers and Communications, Mar., 1995.

* cited by examiner

METHOD AND APPARATUS THAT SIMULATES THE EXECUTION OF PARALLED INSTRUCTIONS IN PROCESSOR FUNCTIONAL VERIFICATION TESTING

This application claims the benefit of the earlier filed U.S. Provisional Pat. App. Ser. No. 60/165,204, filed 12 Nov. 1999 (12.11.99), entitled "Method and Apparatus for Processor Verification" which is incorporated by reference for all purposes into this specification.

BACKGROUND OF THE INVENTION

1. Field of the Invention

The present invention relates to the functional verification of integrated circuit hardware designs. In particular, the present invention provides a method and apparatus that functionally verifies processors capable of executing more than one instruction at the same architectural time.

2. Description of the Related Art

Random test generation programs have been around since the early days of microprocessor verification. These programs automate the complex job of creating large test suites necessary for the functional verification of computer systems. From a historic perspective, functional verification has focused on two types of circuits, combinatorial and sequential. Combinatorial circuits do not contain state information, and therefore the outputs are strictly a function of the input values. Sequential circuits contain memory elements that allow the circuit to have a current state. This makes the output values a function of both the current state and the input values. Early on, those in the industry recognized that creating purely random input values was not an adequate method of verifying sequential circuits, and a new test methodology that included the current state of the circuit was developed.

One method used to generate test patterns for processor verification that is well known in the art is to use a computer to generate a machine executable program that is assembled from instructions, control flags, and data selected from specially prepared tables. To get the expected results, the automatically-assembled test program is simulated on an existing hardware or software golden model under driver control. The test operator can change the drivers, thus changing the conditions under which the test programs are executed. This approach to testing is generally characterized as static testing, because the test patterns are assembled first, and are then executed in the simulation to get the expected results. The test pattern development process is not influenced by the intermediate machine states of the processor during the execution of the test.

While static testing is highly useful, it does have drawbacks. One obvious drawback is that tests created without knowledge of the intermediate machine states have great difficulty achieving high coverage of all the possible intermediate states. In addition, statically generated tests are restricted in that certain real-life cases can never be simulated. For example, some instructions within a statically generated instruction sequence must always be preceded by a specially-inserted data initialization instruction, which would ordinarily not appear in normal operation. Similarly, register usage can be somewhat more limited in a static simulation than it would ordinarily be in normal operation. Finally, statically generated simulations that include loops and branches must be very carefully (and therefore, artificially) constructed to avoid undesirable test results such as endless loops, branches that are never taken, and the like.

To address some of these issues, and to create a test environment that is more efficient and conducts a more robust test of very complex sequential circuits such as processors, the industry has moved toward the use of dynamically generated, biased pseudo-random test patterns. In dynamic testing, instructions are generated, all processor resources and facilities needed for executing the instruction are identified and initialized if required, the instruction is executed on a simulated processor, and the simulated processor state is updated to reflect the execution results. The process iterates, and each instruction generated at the beginning of each iteration is generated with knowledge of the processor state that resulted from the last step executed. Although there are differences in the details of how instructions are generated from test method to test method, in general, instructions are drawn from an instruction pool or tree specified by the test operator that contains the various types of instructions to be tested. In addition, many pseudo-random dynamic test generation methodologies allow the test operator to bias the instruction pool or tree, meaning that the operator can specify what percentage of the total instructions generated and simulated should be load-store instructions, what percentage should be arithmetic instructions, what percentage should be floating point instructions, and so forth. Those skilled in the art are generally familiar with the various current methods used to conduct functional verification of complex circuits using dynamically generated biased psuedo-random test patterns. Readers unfamiliar with these methods are referred to U.S. Pat. No. 5,202,889 to Aharon et al., entitled "Dynamic Process For The Generation Of Biased Pseudo-Random Test Patterns For The Functional Verification Of Hardware Designs" and the patents and publications referenced therein, which is incorporated by reference for all purposes into this disclosure. U.S. Pat. No. 5,202,889 to Aharon is a good example of the current state of the art of pseudo-random test pattern generators and their usefulness for functional verification of complex circuits.

Dynamic testing conducted in the manner described by Aharon eliminates the requirement for the cumbersome predevelopment of data tables and code streams that is necessary to achieve a high level of confidence in static testing. Also, because instructions can be automatically and iteratively generated and then simulated using an appropriately biased instruction pool, dynamic testing can also provide greater test coverage than static testing in a shorter amount of time. Nevertheless, dynamically generated tests using psuedo-random test patterns such as that described by Aharon have drawbacks and limitations as well.

For example, generating stimuli based solely upon current machine state information may not adequately test some complex processors such as Very Long Instruction Word ("VLIW") and Reduced Instruction Set Computer ("RISC") processors, which may have special rules regarding usage of certain resources. Similarly, some processor architectures allow certain groups of instructions to execute at the same architectural time. Instructions that are dynamically generated and simulated in a pseudo-random test pattern must therefore adhere to the processor's instruction grouping rules. This creates another case where the creation of input stimulus is not just a function of the current state, and therefore requires additional components in the test generator to restrict the grouping of instructions and possible operands to a given set of rules. In addition, while a dynamically generated test setup may run flawlessly on a single processor model, the same test may violate memory coherence rules when run on a multiprocessor model.

Finally, the creation of highly deterministic code sequences, such as sequences that execute if then else statements and other conditional control breaks, can be problematic in dynamically generated tests. The present invention addresses the limitations of current-technology dynamic psuedo-random test pattern generators, which currently select and generate instructions based only upon current machine state. The present invention thus provides a better functional verification test of some processors, by taking into account machine state, resource availability, and instruction grouping rules in selecting and generating pseudo-random test stimuli. The present invention is a method and apparatus that generates tests that verify that a processor system under test properly executes two or more instructions issued and executed in parallel. The present invention generates tests by dynamically tracking selected system resources of a golden model and by selecting and scheduling instructions for simultaneous execution on the golden model based upon current and future system resource availability, current architectural state of the golden model, and the instruction grouping rules and other architecturally-related rules of the golden model and the processor system under test. The present invention simulates the parallel execution of valid groups instructions, and then updates the architectural state of the golden model. The present invention outputs a test that includes groups of instructions designated for parallel execution on the processor system under test, plus information regarding the correct intermediate states of selected system resources during the test, which enables the user to compare the test results obtained when the test is run on a processor system under test with results obtained when the test is run on a golden model.

SUMMARY

The present invention is a method and apparatus that dynamically generates tests that can be used to verify that a processor system under test properly executes two or more instructions issued and executed in parallel. The present invention includes a user preference queue, a rules table, plurality of resource-related data structures, an instruction packer, and an instruction generator and simulator. The user preference queue has a number of entries, each of which comprises an instruction to be tested, a group or tree of instructions to be tested, or a test generator control command. The resource-related data structures comprise information such as actual and/or predicted past state, present state, and future state of selected system resources. In this specification the term "system resources" is defined to include both architectural resources and conceptual resources. Architectural resources include resources like the architectural state of the processor (as defined by the state of specific registers), other registers, the load/store buffer, and the like. The term "conceptual resources" refers to resources that may not actually exist within the architectural state of the machine under test, but instead represent a simple way to represent complex interactions, such as whether or not a branch instruction is pending, or the usage of various units over time, or estimated bus traffic at a particular point in time.

The instruction packer creates a very long instruction word that generally comprises a packet or bundle of two or more instructions valid for parallel execution by the processor under test. The instruction packer selects instructions from the entries in the user preference queue, based upon resource availability as indicated by the resource-related data structures and the architecturally-related instruction grouping rules appropriate for the golden model and the processor system under test. In one mode, the instruction packer selects a first instruction from an instruction tree in the user preference queue. The instruction packer then selects a second instruction to be packed into one VLIW packet with the first instruction by eliminating instructions in the instruction tree that are ineligible for selection, either because those instructions requires a resource that a resource-related data structure indicates is unavailable, or because they require a resource that will be utilized by the first instruction selected and cannot be shared between instructions within a VLIW packet, or because they conflict with the instruction grouping rules appropriate for the golden model and the processor system under test. The instruction packer continues selecting instructions in this manner, by first defining potential groups of instructions valid for selection and then selecting instructions from those groups, until the instruction packer has selected a group of N instructions, where N is the maximum number of instructions that the golden model and the processor system under test can execute in parallel, or a until there are no more instructions in the instruction tree that can be validly selected.

In another mode, the instruction packer selects instructions in order, from an ordered list that the user provides and that is loaded into the user preference queue. In this mode, the instruction packer selects instructions for parallel execution in the order specified by the user, but stops packing instructions into a VLIW word if an instruction specified by the user cannot be executed in parallel with previously selected instructions, because of resource unavailability, conflicting resources with previously selected instructions, or violations of the instruction grouping rules. In this case, the instruction packer either packs "no operation" instructions into the remaining slots of the VLIW packet, or simply issues the VLIW word "as is" if the processor architecture allows VLIW packets of varying lengths and formats.

The present invention marks instructions that have been packed into a VLIW packet to indicate that the instructions should be executed in parallel. The instruction generator and simulator generates the instructions selected by the instruction packer, and then simulates the execution of the instructions on the golden model. The present invention updates the appropriate resource-related data structures that correspond to the system resources utilized by the instruction. The present invention evaluates the architectural state of the golden model and updates the appropriate resource-related data structures.

BRIEF DESCRIPTION OF THE DRAWINGS

To further aid in understanding the invention, the attached drawings help illustrate specific features of the invention and the following is a brief description of the attached drawings.

DETAILED DESCRIPTION OF THE INVENTION

The present invention is a method and apparatus that enables a processor developer to verify that a processor under test properly executes two or more instructions issued and executed in parallel. As described in detail herein, the present invention allows for a robust verification of the parallel execution capabilities of VLIW and other complex processor systems because the present invention generates a processor test while tracking both system resources and the architectural state of the processor golden model. The present invention selects instructions for generation based upon resource availability, processor state, and processor instruction grouping rules. The present invention packs those instructions into a valid very long instruction word and then simulates the execution of the VLIW by the processor golden model. The present invention provides the processor developer with a test comprising a set of pseudo-randomly generated instructions that include instruction packets appropriate for parallel execution, plus time-based intermediate state information produced when those instructions are executed on a golden model, that can then be run on the processor under test for comparison and verification.

This disclosure describes numerous specific details that include specific hardware and software structures and example instruction streams in order to provide a thorough understanding of the present invention. One skilled in the art will appreciate that one may practice the present invention without these specific details. In addition, other than the examples provided herein, details concerning the architecture and design rules associated with current advanced VLIW and other parallel issue and/or execution-capable processors are not provided in this disclosure to avoid obfuscation of the present invention. Those skilled in the art will understand that reference herein to processor implementation rules refers to the manufacturer's rules detailed in designers' reference guides supplied by processor manufacturers, such as Texas Instruments' Instruction Set Reference Guide for the TMS320C62xx CPU, Texas Instruments (July 1997), which is incorporated into this specification by reference for all purposes.

Figure 1:
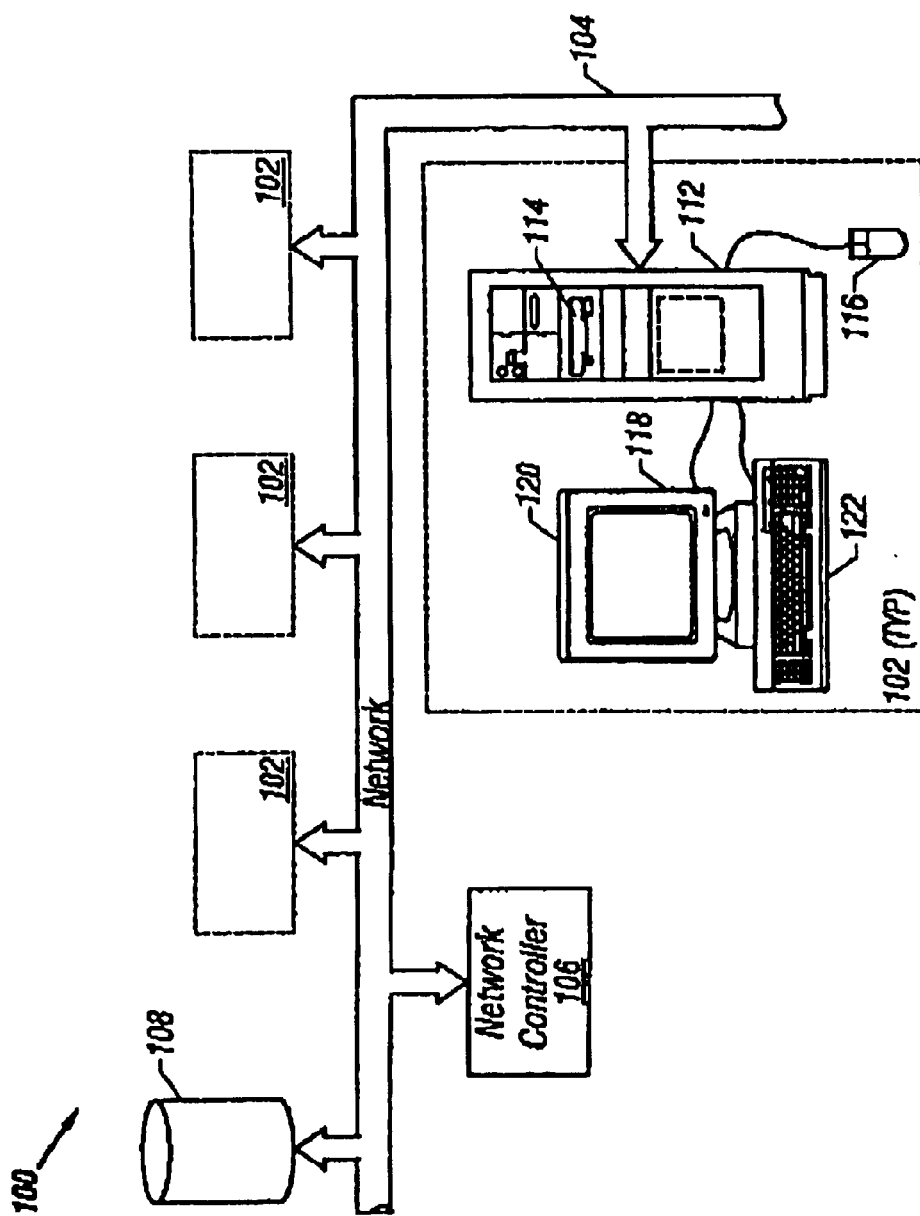
FIG. 1 shows a typical networked computer environment.

The present invention is preferably practiced in the context of a standalone or networked personal computer test setup such as that depicted in FIG. 1. In FIG. 1, typical network 100 includes one or more computer workstations 102 networked together via network connection 104, which is controlled by network controller 106. The network 100 may also include various peripheral devices, such as network storage device 108 and one or more printers (not shown in FIG. 1). Typical computer workstation 102 includes computer 112, internal storage media such as RAM 118, external storage media such as a floppy disk 114, and various interface devices such as a mouse 116, a monitor 120, and a keyboard 122. Although a particular computer may only have some of the units illustrated in FIG. 1, or may have additional components not shown, most computers will include at least the units shown.

In the embodiment described herein, the present invention is implemented in the C++ programming language. C++ is a compiled language, that is, programs are written in a human-readable script and this script is then provided to another program called a compiler, which generates a machine-readable numeric code that can be loaded into, and directly executed by, a computer. Those skilled in the art are very familiar with C++, and many articles and texts are available which describe the language in detail. While the exemplary embodiment detailed herein is described using C++ code fragments and pseudo-code, those skilled in the art will understand that the concepts and techniques disclosed herein can be practiced by test designers and operators using any higher-order programming language, such as Java, without departing from the present invention.

Figure 2:
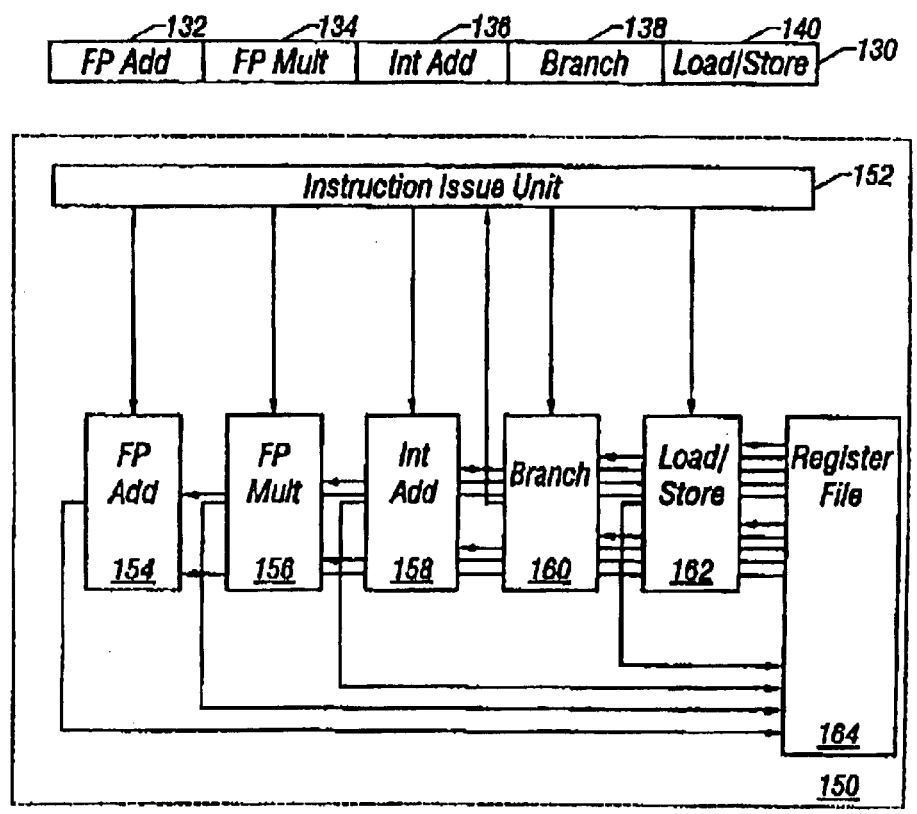
FIG. 2 shows a block diagram of a hypothetical VLIW processor architecture and its corresponding VLIW instruction format.

FIG. 2 is a block diagram showing a hypothetical VLIW processor 150 having two floating point units 154, 156, an integer arithmetic logic unit 158, a branch processor 160, and a load/store unit 162. VLIW processor 150 also includes an instruction issue unit 152 and a register file 164. FIG. 2 also shows a very long instruction word format 130 for hypothetical VLIW processor 150. As shown in FIG. 2, the instruction word format 130 includes fixed slots for five RISC-like instructions: a floating point addition instruction 132, a floating point multiplication instruction 134, an integer arithmetic instruction 136, a branch instruction 138, and a load/store instruction 140. Those skilled in the art will recognize that FIG. 2 shows a highly simplified, hypothetical case only. For example, rather than having fixed "slots" and fixed-length instruction words, some VLIW processors are much more complex and may utilize instruction words of varying lengths, comprising one or more simple instructions that do not reside in fixed slots, but can be packed in any order. The intention of FIG. 2 is to demonstrate that a VLIW instruction comprises a group or packet of independent, RISC-like instructions that are issued in parallel to multiple independent execution units within the processor. The architecture of the processor thus dictates what kinds of instructions can be grouped together and executed in parallel. The hypothetical processor shown in FIG. 2 can execute simultaneously one floating point addition instruction, one floating point multiplication instruction, one integer arithmetic instruction, one branch instruction, and a load/store instruction, as long as the instructions all utilize different local destination registers.

Figure 3:
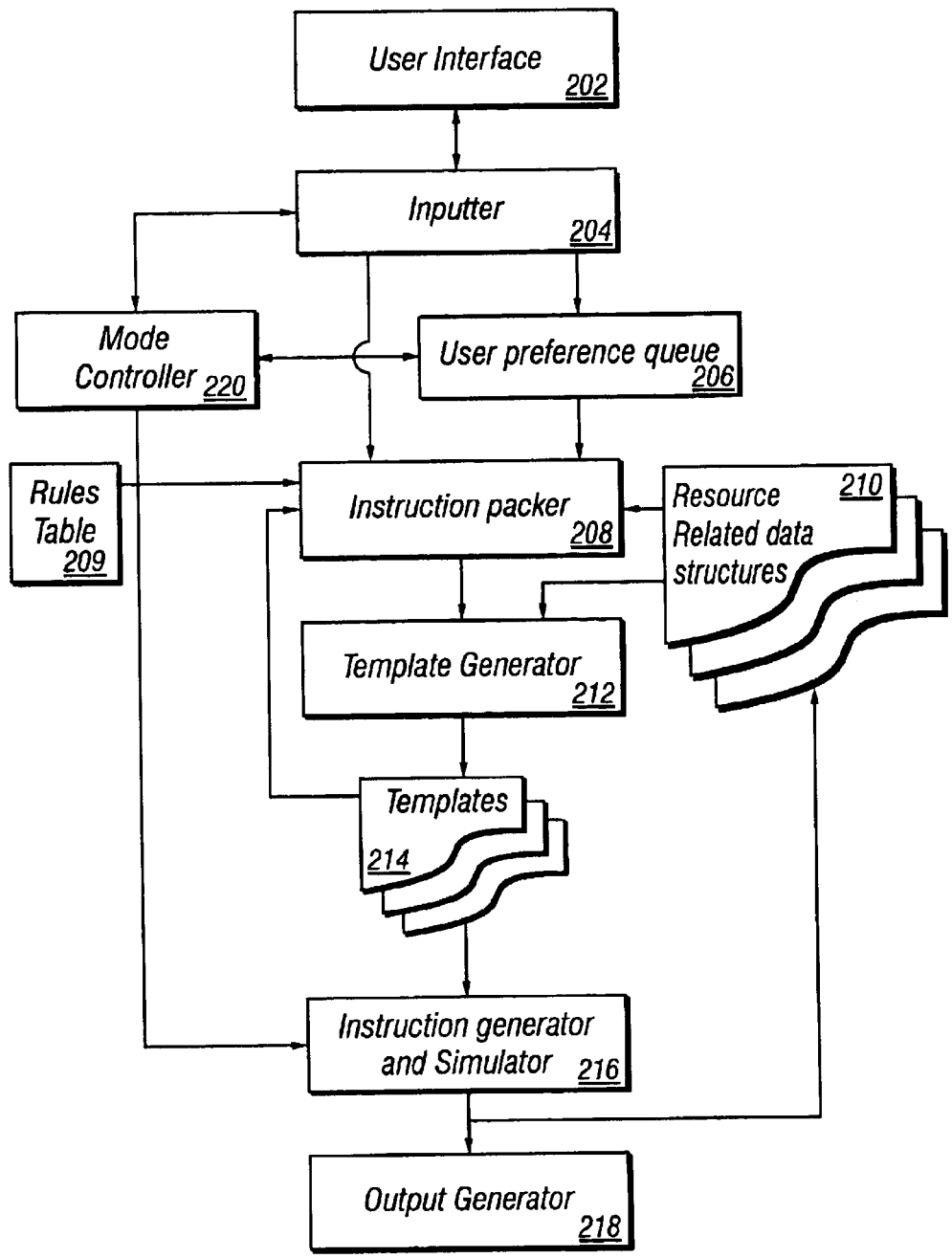
FIG. 3 shows the major components of the present invention and their high-level interaction with each other.

FIG. 3 is a high-level functional block diagram of the test generation apparatus of the present invention. As shown in FIG. 3, the present invention includes a user interface 202, an inputter 204, a user preference queue 206, an instruction packer 208, a rules table 209, a set of resource-related data structures 210, a template generator 212, one or more templates 214, a mode controller 220, an instruction generator and simulator 216, and an output generator 218.

The user interface 202 allows users of the present invention to specify the contents, preferences, and control information required to create a functional verification test of a simulated processor or processor system. In a preferred embodiment, the user interface is a graphical, interactive user interface wherein the user can specify the types of instructions to be simulated by selecting from a menu of instruction choices. In addition, the user can specify test generation preferences, such as whether instructions are to be generated using a biased instruction tree or an ordered instruction list, for example, or whether iterative loops should be inserted, how many instructions can be executed in parallel, whether certain instructions should be executed in parallel with others, or whether the generator should insert and run macros between instructions. Those skilled in the art are familiar with the types of instructions and typical generation controls necessary for the dynamic generation of biased pseudo-random test patterns for processor verification, and therefore further detail regarding instruction selection and generation preferences is not provided herein. In addition, those skilled in the art will recognize that a graphical user interface is optional; advanced users may provide inputs to the present invention using other input methods, such as creating and providing an input text file that contains the necessary instruction generation information.

The user interface 202 also enables the user to specify test generation controls that control the generation mode and dictate the user's controls for specific instructions. For example, in a preferred embodiment, the user can assign specific registers to be source registers or destination registers. Alternatively, the user can assign a specific initial source or destination value for registers and memory locations. Users can specify specific addresses as target addresses for branch instructions or memory operations. Those skilled in the art will recognize that current dynamic pseudo-random test pattern generators generally provide similar instruction and test generation controls, and therefore, further detail regarding the capabilities of the present invention to provide the user with control flexibility and options regarding dynamically generated and executed instructions is not provided here.

The inputter 204 accepts test content, preference, and control information from the user via the user interface 202, and adds that information to the user preference queue 206 and the mode controller 220. Each entry in the user preference queue 206 is an instruction, a group/tree of instructions, or a generator command. If the user has indicated that an ordered list of instructions is to be generated and simulated, then the inputter puts that list into the user preference queue in the order specified. If, on the other hand, the user has indicated that some number of instructions are to be generated randomly, then the inputter adds an entire tree of instructions, which may or may not be biased by the user. When the user preference queue 206 shrinks below a threshold, additional elements are added by the inputter 204.

The operation of the mode controller 220 is described in detail in copending patent application, U.S. patent app. Ser. No. 09/709,855, filed 10.11.00 (10 Nov. 2000 (docket number 62061.0103) entitled "Method and Apparatus for Static Test Pattern Generation Within a Dynamic Pseudo-random Test Program Generation Framework," (hereinafter, the "Static/Dynamic Generator Patent") which is incorporated by reference into this specification for all purposes. In addition, the Static/Dynamic Generator Patent also describes the use of templates 214 and the operation of the test generator in both sequential mode and dynamic mode, and details regarding templates and the test generator operating modes are not repeated herein. While the present invention makes use of templates as described in the Static/Dynamic Generator Patent, the special sequential operating mode of the test generator described in the Static/Dynamic Generator Patent does not apply to the present invention. For the purposes of this disclosure, the reader should assume that the test generator is always operating in dynamic mode.

Returning to FIG. 3, information from the user preference queue 206, the resource-related data structures 210, the rules table 209, and existing templates 214 is combined in the instruction packer 208 to create sequences of instructions or groups of parallel instructions for generation and simulation. As explained in further detail below, the resource-related data structures 210 are data structures that at created, maintained, and updated to track the actual and/or predicted past state, present state, and future state of selected system resources. In this specification the term "system resources" is defined to include both architectural resources and conceptual resources. Architectural resources include resources like the architectural state of the processor (as defined by the state of specific registers), other registers, the load/store buffer, and the like. The term "conceptual resources" refers to resources that may not actually exist within the architectural state of the machine under test, but instead represent a simple way to represent complex interactions, such as whether or not a branch instruction is pending, or the usage of various execution units over time, or estimated bus traffic at a particular point in time. Practitioners of the present invention may wish to adopt the tracking methodologies and approaches described in detail in copending patent application, U.S. patent app. Ser. No. 09/709,901, filed 10.11.00 (10 Nov. 2000) (docket number 62061.0106), now U.S. Pat. No. 6,606,721, entitled "Method and Apparatus that Tracks Processor Resources in a Dynamic Pseudo-Random Test Program Generator," (hereinafter, the "Resource Tracking Patent") which is incorporated by reference into this specification for all purposes, to identify system resources appropriate for tracking and to track those resources.

The instruction packer 208 uses the resource-related data structures to determine whether resources are currently available, or will be available, when they are needed by specific instructions. Instructions using resources that are either currently in use, or will be in use when they are required are not eligible to be selected and scheduled by the instruction packer 208.

The rules table 209 comprises a table of instruction grouping rules, as dictated by the architecture of the processor under test. For example, the rules table 209 for the hypothetical VLIW processor shown in FIG. 2 would indicate that two floating point addition instructions cannot be issued and executed in parallel. Likewise, two branch instructions, two integer arithmetic instructions, or two load/store instructions cannot be packed into the same VLIW group. In a preferred embodiment, the rules table 209 may also include other architecturally-related information useful to the instruction packer, such as the number of processor cycles each individual execution unit requires to execute an instruction, or whether the processor is capable of handling VLIWs of varying lengths, or whether the instruction issue unit can issue instructions to selected idle execution units while others are still operating on previously issued instructions, or whether there are restrictions on register usage by instructions within a single VLIW. Those skilled in the art are very familiar with these architecturally-dictated design rules published by processor manufacturers, and the need to adhere to those rules when developing new processor systems utilizing the architectural approaches and limitations of existing processors.

In a preferred embodiment, the instruction packer 208 selects instructions from the user preference queue 206 and packs them into VLIW groups in two different ways: either randomly, using an instruction tree, or consecutively, according to the order specified by the user. Each instruction selection methodology is explained below.

If the user has specified, through the user interface, that some number of instructions should be generated randomly, then the present invention will place an instruction tree into the user preference queue 206. The instruction packer 208 selects a first instruction that can be executed, based upon the current system state information and resource availability information contained within the relevant resource-related data structures 210. The instruction packer 208 then selects a group of potentially valid instructions in the user preference queue that can be selected next by eliminating all instructions that are ineligible for selection. For example, instructions within the instruction tree are ineligible for selection if they cannot be executed in parallel with the first instruction selected, as indicated by the rules table 209. Instructions are also ineligible for selection if their resource needs conflict with the first instruction selected, such as might occur if a potential instruction needs a destination register that the first selected instruction will be using. Those skilled in the art will understand that resource conflicts will be ordinarily be dictated by the processor architecture, just as a processor's instruction grouping rules are dictated by the architecture. For example, some architectures may allow two instructions within the same VLIW packet to utilize the same register if it is a source register, but will not allow two instructions to use the same destination register. Others may prohibit all forms of register sharing. Practitioners of the present invention will thus customize the resource conflicts rules implemented in a specific embodiment as required to reflect the architectural requirements and rules of the processor under test.

After the instruction packer 208 eliminates all ineligible instructions from the instruction tree, the instruction packer 208 then selects a second instruction for execution in parallel with the first instruction. The instruction packer 208 continues in this manner, repeating the elimination-and-select process by eliminating instructions that utilize either a system resource that conflicts with any previously selected instruction, or that cannot be executed in parallel with any previously selected instruction. The selection process ends when either the maximum number of instructions has been selected (five, in the case of the hypothetical VLIW processor shown in FIG. 2), or no more instructions from the instruction tree are eligible for selection. In the latter case, if the VLIW group is not completely packed and the processor architecture requires all VLIW packets to be of a specific length and format, the instruction packer will fill the remaining slots with "no operation" instructions. Alternatively, if the processor architecture allows VLIW packets of varying lengths, "no operation" instructions may not be required and the VLIW packet can continue through the process as is.

When the user has specified that a specific listing of instructions are to be executed in parallel by providing an ordered instruction list to the present invention via the user interface, the instruction packer 208 follows that sequence, to the extent that the user's instruction sequence comprises a group of instructions that can be validly executed in parallel. In other words, the instruction packer 208 selects the user's first specified instruction from the user preference queue 206 if system resources are available, then selects the user's second specified instruction if system resources are available and the user's second specified instruction can be validly grouped with the first instruction, according to the processor's instruction grouping rules. The instruction packer 208 then selects the user's third specified instruction, assuming it does not utilize resources that conflict with the first and second instructions and can be validly grouped with the first and second instructions, and so forth. When the instruction packer 208 encounters an instruction that is ineligible for execution, either because of conflicting resources or because of conflicting grouping rules, the instruction packer 208 stops selecting instructions for a given VLIW packet, and either issues the VLIW packet as is, or fills the remaining slots with "no operation" instructions if required by the processor architecture. When the first instruction on a user's ordered list cannot be selected because of conflicting resources, the instruction packer selects one or more "no operation" instructions until the required resource becomes free and the instruction can be validly selected and packed into a VLIW bundle.

For example, assume that the user is testing a processor system having an architecture like the hypothetical VLIW processor shown in FIG. 2. The user has therefore specified that up to five instructions can be packed into one very long instruction word for simulation. Also assume, for this example, that the user has specified that 100 instructions are to be randomly generated for the test.

The present invention places an instruction tree into the user preference queue 206. The instruction packer 208 checks the resource-related data structures 210, selects a first instruction based upon resource availability, and places the instruction into the proper position in the VLIW instruction format as defined by the processor's instruction rules. Assume, for this example, that the first instruction selected is a floating point addition instruction that will require operands A and B and registers 1, 2, and 3.

For simplicity, we will also assume for this example that the hypothetical VLIW processor does not allow any resource sharing. In this case, the instruction packer 208 then "marks out" all instructions within the tree that require operands A and B and registers 1, 2, and 3, and additionally, all other instructions in the tree that must be executed by the processor's floating point addition execution unit. The instruction packer 208 then selects a second instruction from the remaining instructions in the tree. The second instruction must meet the same requirements as the floating point instruction selected as the first instruction: all system resources required to execute the second instruction must be currently free, the second instruction may not utilize the same system resources required by the instruction already selected, and it must be an instruction that can be validly executed in parallel with the floating point instruction. Returning to the hypothetical VLIW processor shown in FIG. 2, if the instruction packer selects, as the first instruction, a floating point addition instruction that will require operands A and B and registers 1, 2, and 3, a valid second instruction might be a floating point multiplication instruction using operands D and E and registers 4, 5, and 6. The instruction packer would not select another floating point addition instruction, because that selection would violate the processor's instruction grouping rules. Similarly, the instruction packer would not select a load/store instruction or a branch instruction involving operands A or B, or any of registers 1, 2, or 3, because those system resources will be in use and tied up for some number of cycles by the floating point instruction selected as instruction number one. After a second instruction is selected, the instruction packer selects a third instruction, and so forth, until (in this example) either all five instruction slots are filled, or there are no remaining potentially valid instructions remaining in the original instruction tree loaded into the user preference queue.

After the instructions are selected and packed into the VLIW bundle by the instruction packer 208, the template generator 212 generates a template 214 corresponding to each instruction. In this specification, a template 214 is a data structure that contains an instruction, plus all preferences and data required to execute the instruction. The template for each instruction in a VLIW packet also indicates that it is to be executed in parallel with other instructions, in the manner specified by the processor's design rules.

For example, some VLIW processors utilize a bit in the instruction that indicates that the instruction is to be issued and executed in parallel with whatever instruction immediately follows it. The instruction that follows may also have that bit set, indicating that the instruction that follows it should also be issued and executed at the same time as the previous two instructions, and so on. The processor "finds" the last instruction in each group designated for parallel issue and execution because the last instruction does not have the parallel instruction bit set, or alternatively, includes another indication that it is the last instruction in a parallel execution group.

Other VLIW processors may require an indication in the first instruction in a group designated for parallel execution that the next "N" instructions should be fetched, issued, and executed simultaneously. These parallel execution rules are defined by the processor architect, in the same manner as the instruction grouping rules discussed above. Those skilled in the art are familiar with the various techniques processor designers use to designate instructions for parallel execution, and practitioners of the present invention that are adapting the present invention for use with various VLIW architectures will understand how to build templates that include the proper indications for parallel execution on a processor under test designed in accordance with a specific architecture.

After templates 214 are created, the instructions corresponding to the templates are generated and then simulated. The instruction generator and simulator 216 converts each template 214 into an instruction for the golden model. In a preferred embodiment, this process involves translating the instruction into assembly language or binary, resolving all the instruction's subfields, and initializing any necessary resources to create a valid instruction. The instruction generator and simulator 216 then either calculates or predicts current and future resource utilization as described in further detail below and updates the appropriate resource-related data structure 210. The instruction generator and simulator 216 initiates a step function of the architecturally correct golden model and sends the outstanding instructions to the golden model, which simulates the parallel execution of the instructions and updates its state registers accordingly. The instruction generator and simulator 216 assesses the architectural state of the golden model as a function of time (processor cycles) and updates the appropriate resource-related data structures 210 in preparation for the next iteration of the instruction selection process, and for utilization by the output generator 218, as described below.

The output generator 218 generates a machine readable output file containing the test program. The output test file contains the starting state for each component in the system, the commands executed as a function of time, and the intermediate and final states of the golden model as a function of time. Users can then run the output test file on a processor system under test, which provides the same test stimulus to the system under test as was provided to the golden mode. Users then compare the time-based intermediate and final states of the system under test with the known correct time-based intermediate and final states of the golden model, to verify the functionality of the device or system under test.

Figure 4A:
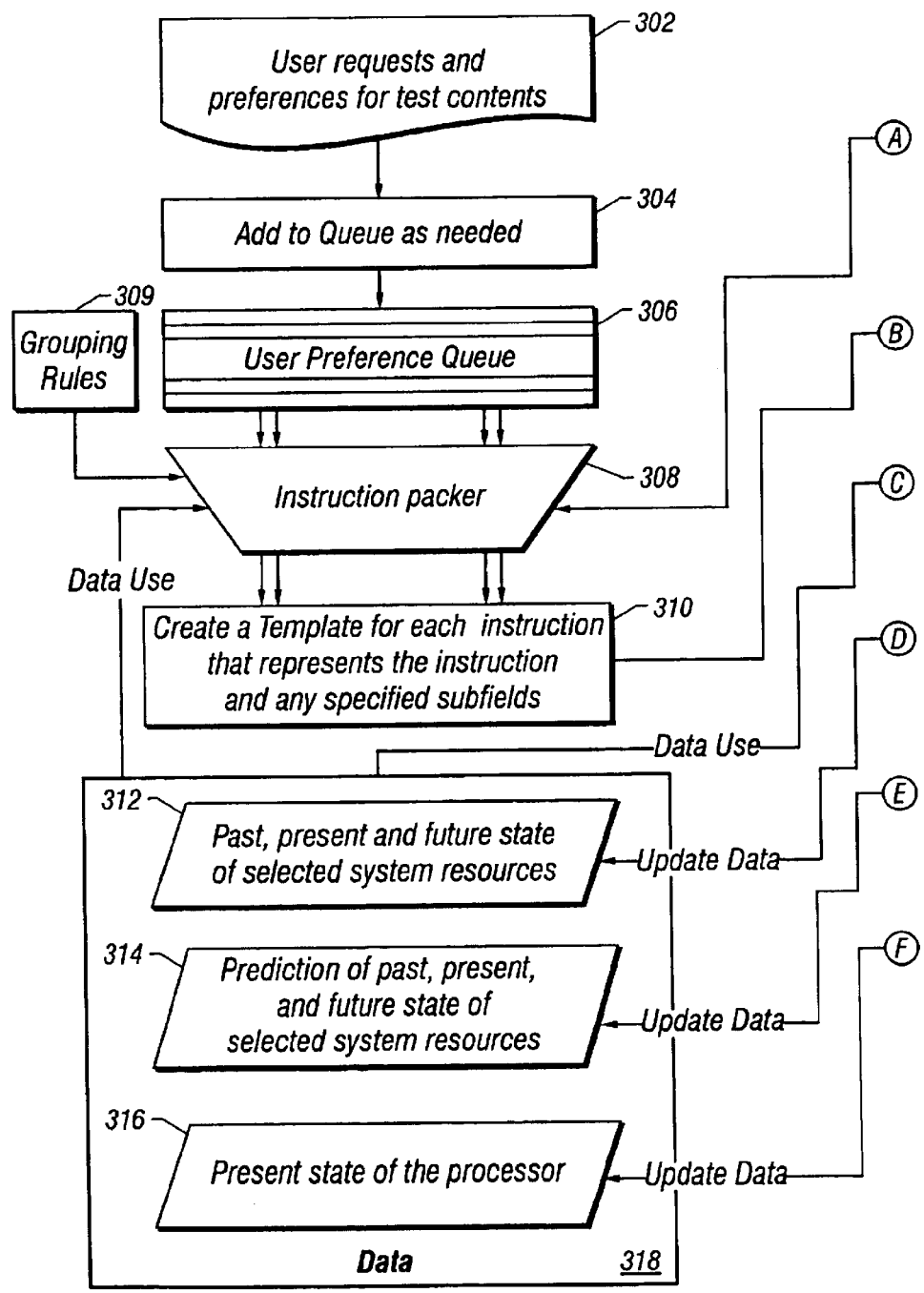
FIGS. 4A and 4B combine to form a flowchart that shows the control and operational flow of the present invention as it creates and conducts functional verification tests.
Figure 4B:
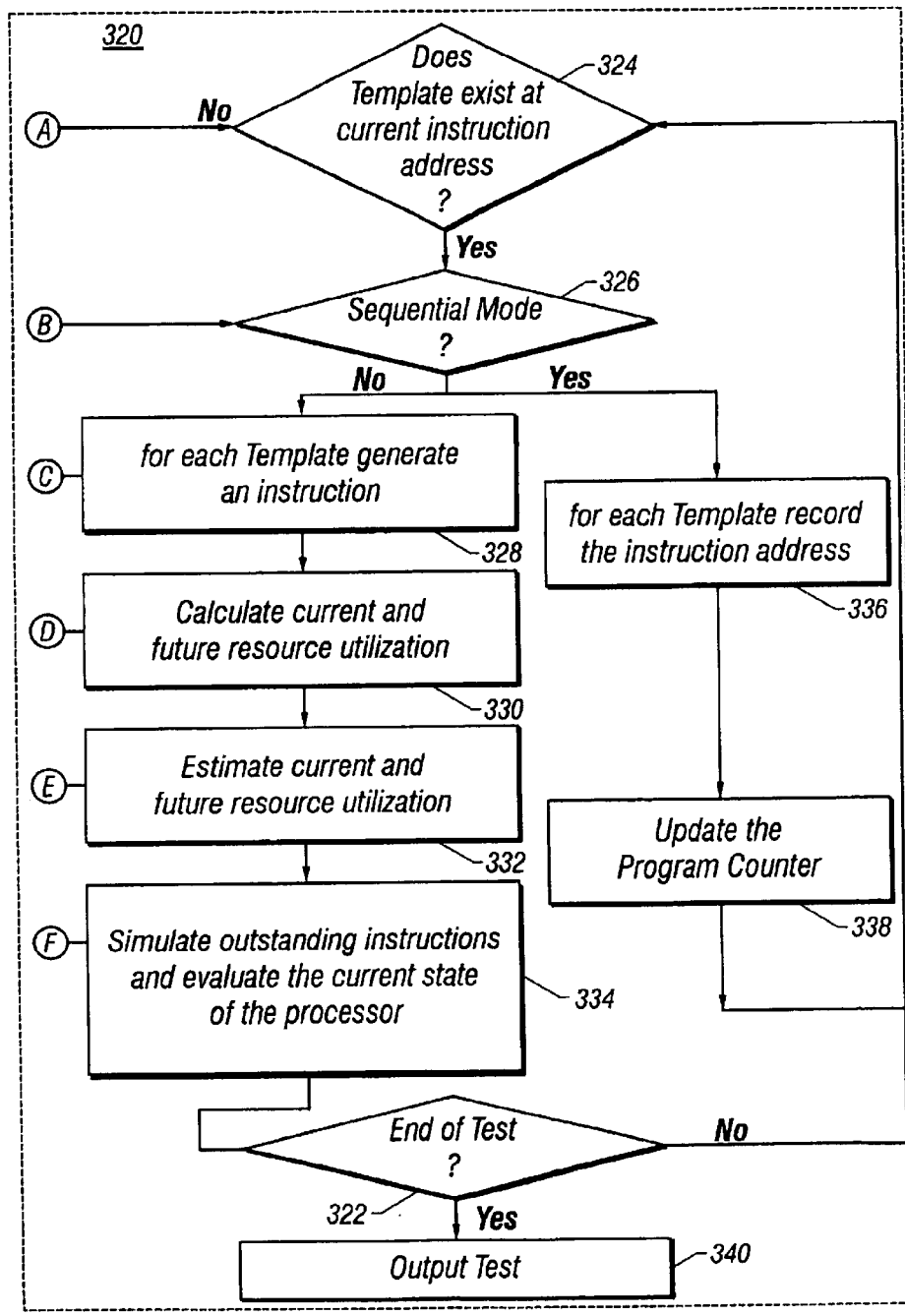

FIGS. 4A and 4B show a flowchart that illustrates the control and operational flow of the present invention as it creates functional verification tests. At 302, the test operator provides the test inputs (test content, control, and preference information as described above), which are added to the user preference queue at 306 as required by 304. At 308, the instruction packer interfaces with the user preference queue 306, the resource-related data structures represented in FIG. 4A at 312, 314, and 316, and the processor grouping rules table at 309. Using the FIG. 2 VLIW processor as an example, at 308, the instruction packer selects five instructions to be packed together into a VLIW in accordance with the procedure described above. These five instructions are then sent in a group to the template generator, which at 310, creates a template for each instruction in the VLIW that is marked for parallel execution in accordance with the processor's architectural rules, as described above. Therefore, continuing with the hypothetical VLIW processor as an example, the template generator might create the following group of templates corresponding to the five possible instructions packed into the VLIW as follows:

| Template No. | Program Counter | Template contents |
| --- | --- | --- |
| 1 | 1000 | Floating point addition instruction and associated information, marked for parallel execution with following instruction |
| 2 | 1001 | Floating point multiplication instruction and associated information, marked for parallel execution with the following instruction |
| 3 | 1002 | Integer addition instruction and associated information, marked for parallel execution with the following instruction |
| 4 | 1003 | Branch instruction and associated information, marked for parallel execution with the following instruction |
| 5 | 1004 | Load/Store instruction and associated information, not marked for parallel execution |

After the group of templates is created at 310, the present invention jumps to the main loop of the test generator 320, shown in FIG. 4B, and checks the operational mode at 326. As the reader will recall, the test generator will always be in dynamic mode when implementing parallel scheduling and simulation of instructions as described herein.

At 328, the instructions corresponding to all outstanding templates are generated at 328, resources are calculated 330, estimated 332, the appropriate resource-related data structures are updated at 312 and 314, and the group of instructions are then sent to the golden model at 334 for simulation. The present invention evaluates the state of the golden model and records that state, as a function of time, for the output file. The present invention also updates the appropriate resource-related data structures that correspond to the golden model architectural state in preparation for the next instruction selection and packing step.

At the next check at 324, a template will not exist at the current program counter, and the present invention will return to the instruction packer, which then selects a new group of instructions for parallel execution using the procedure described above, and the entire process repeats until the end of the test.

As described above, the present invention is also capable of generating tests where the user can specify a specifically ordered group of instructions to be generated for parallel execution. In that case, the user provides an ordered list of instructions via the user interface, rather than an instruction tree. In this case, as described above, the instruction packer selects instructions from the list in the user preference queue in the order specified by the user, assuming that system resources are available and the instructions listed do not violate the processor's instruction grouping rules. Groups of instructions are sent to the template generator, and groups of templates are created at 310 in the same manner as that described above. After a group of templates is created for a VLIW packed by the instruction packer, the present invention jumps to the main loop 320, and generates and simulates the instructions as described above. Following simulation of each VLIW packet, the present invention will return to the instruction packer at 308, which will then pack the next VLIW group using the instructions in the user's list, picking up where it left off with the previous VLIW. The present invention will continue packing VLIW instructions and creating template sequences in this manner, as long as nonconflicting resources are available and as long as the processor's instruction grouping rules are not violated. If the present invention encounters an instruction on the user's list that cannot be selected due to (for example) unavailable system resources, in one embodiment, the instruction packer simply packs one or more "no operation" instructions into VLIW groups until the resource becomes available and the instruction can be packed, generated, and simulated.

Resource Tracking.

As described above, the present invention selects instructions appropriate for parallel execution by, among other things, examining the available system resources and selecting only those instructions that can be executed because the system resources they require are or will be free at the appropriate time. After groups of instructions are generated at 328 in FIG. 4B, resource usage is reevaluated at 330 and 332, and the appropriate resource-related data structures are updated at 312 and 314. These updated resource-related data structures affect the selection of the next group of instructions that the instruction packer selects for the next VLIW packet to be generated and simulated.

The present invention tracks the current state of architectural resources, such as individual registers, the load/store buffer, the architectural state of the processor as defined by a specific subset of registers, and the like, as a function of time. The present invention also tracks the utilization of the various execution units within the processor, again as a function of time. For example, in an embodiment of the present invention customized to generate a test for a processor system designed according to Texas Instruments' TMS320C62xx architecture, floating point instructions require four processor cycles to complete. The present invention tracks the utilization of the floating point execution unit, and the instruction packer will only select a floating point instruction when the floating point unit is free, as indicated by the relevant floating-point execution unit data structure. Furthermore, when a floating point instruction is packed into a VLIW packet and the corresponding floating point instructions are generated by the instruction generator, the present invention designates the floating point execution unit as unavailable for four processor cycles. Assuming a VLIW group is packed and issued during each processor cycle, the instruction packer is thus barred from selecting another floating point instruction until four processor cycles have elapsed, at which point the floating point unit becomes available. Similarly, the destination register(s) that the floating point instruction uses are also unavailable for four processor cycles, after which they will be updated to reflect the values determined by the execution of the floating point instruction. The instruction packer is thus barred from selecting another instruction that requires the same destination registers used by the floating point instruction until four processor cycles have elapsed. Those skilled in the art will recognize that, while neither the floating point execution unit utilization nor the values in or utilization of specific general purpose registers is reflected in the defined architectural state within the golden model, tracking these system resources to aid in the efficient scheduling of test instructions is highly useful.

Practitioners of the present invention that are customizing the present invention for a specific processor architecture can glean the information required to track relevant system resources from the programmer's manual provided by the processor's manufacturer. After reading this specification or practicing the present invention, practitioners of the present invention will understand that there are a number of different design approaches that will each accomplish the resource tracking described herein. For example, practitioners of the present invention might include a resource tracker at 330 that examines the type of instruction generated (e.g., a floating point instruction or a branch instruction), turns to a table to determine the number of processor cycles to mark the associated execution unit as "unavailable" (e.g., 4 cycles, in the case of the floating point execution unit or 2 cycles, in the case of the branch unit), and updates the data structure associated with the relevant execution unit to reflect that the execution unit is unavailable for the appropriate number of cycles. Similarly, the same tracker might use the same table to mark the registers and other resources associated with the instruction (identified on the instruction's template) as unavailable during the appropriate number of processor cycles. Practitioners of the present invention might choose to incorporate two pieces of information into the data structure associated with registers: the availability of the register, and the value currently loaded into the register. Alternatively, practitioners might choose to utilize separate data structures for individual register availability and individual register value.

When tracking the future state of selected system resources (i.e., unavailability for a specific number of processor cycles), those skilled in the art will recognize that the tracker must also update the data structures associated with the system resources at the appropriate time to reflect that the resource is now available again, thus indicating to the instruction packer that an instruction that requires the newly-freed resource can now be properly selected and packed into a new VLIW.

Unlike the execution unit utilization or specific register utilization or states, some system resources that would be useful to track to maintain efficiency in scheduling instructions cannot be easily tracked. For example, processors typically execute loads and stores from the load/store buffer on a non-interrupt, background basis. Consequently, it is difficult to determine the precise contents of the load/store buffer at a specific point in time, because it is difficult to determine at a specific instance whether pending loads and stores have been written to and from memory. Nevertheless, those skilled in the art can construct a heuristic model that represents a prediction of traffic in the load/store buffer as a function of the number and timing of load/store instructions generated in a specific test. When the predicted traffic through the load/store buffer reaches a certain predetermined threshold, the present invention can update a data structure that corresponds to the load/store buffer to designate the load/store buffer as unavailable. This will prevent the instruction packer from selecting further load/store instructions for packing into further VLIW groups until the load/store traffic drops below the specified threshold, at which time the tracker redesignates the load/store buffer as available. Alternatively, the user may want to specifically test a processor's ability to function properly when the load/store buffer is highly stressed by dense traffic to and from memory. In this case, the data structure corresponding to the load/store buffer would not be marked as unavailable, and the instruction packer would continue to select and pack load/store instructions, but the user would want to continue to monitor the traffic density in the load/store buffer over time.

System resources that practitioners of the present invention may find useful to track, either directly as described in the execution unit example, or by predictive methods as described in the load/store buffer example, include the utilization of various execution units within the system, state and utilization of general or special purpose registers, subfields of general or special purpose registers, instruction and data caches, system bus status, physical memory, virtual memory system page tables, and resources capable of generating system exceptions and interrupts. The reader is referred to the Resource Tracking Patent for details on resource tracking methodologies that can be employed to generate resource-related data structures appropriate for use with the present invention.

To summarize, the present invention is a method and apparatus that generates a test that enables the verification that a processor system under test properly executes two or more instructions issued and executed in parallel. The present invention includes a user preference queue, a rules table, plurality of resource-related data structures, an instruction packer, and an instruction generator and simulator. The user preference queue has a number of entries, each of which comprises an instruction to be tested, a group or tree of instructions to be tested, or a test generator control command. The resource-related data structures comprise information such as actual and/or predicted past state, present state, and future state of selected system resources.

The instruction packer creates a very long instruction word that can comprise two or more instructions valid for parallel execution by the processor under test. The instruction packer selects instructions from the entries in the user preference queue, based upon resource availability as indicated by the resource-related data structures and the architecturally-related instruction grouping rules appropriate for the golden model and the processor system under test. The instruction packer also insures that instructions within a single VLIW do not require conflicting system resources.

The present invention marks instructions that have been packed into a VLIW to indicate that the instructions should be executed in parallel. The instruction generator and simulator generates the instructions that correspond to each instruction selected by the instruction packer, and then simulates the execution of the instructions on the golden model. The present invention updates the appropriate resource-related data structures that correspond to the system resources utilized by the instruction. The present invention also evaluates the architectural state of the golden model as a function of time and updates the appropriate resource-related data structures.

Other embodiments of the invention will be apparent to those skilled in the art after considering this specification or practicing the disclosed invention. The specification and examples above are exemplary only, with the true scope of the invention being indicated by the following claims.

We claim:

1. A processor verification test apparatus that uses a golden model to generate a test program that verifies that a processor system under test properly executes two or more instructions issued and executed in parallel, comprising:

a user preference queue that comprises queue entries wherein each queue entry further comprises an instruction to be tested, a group or tree of instructions to be tested, or a test generator control command;

a plurality of resource-related data structures, wherein each said resource-related data structure comprises information concerning selected system resources of the golden model, wherein said information comprises two or more of the following: actual past state, actual present state, actual future state, predicted past state, predicted present state, or predicted future state;

an instruction packer coupled to said user preference queue and said resource-related data structures, said instruction packer creates a group of N instructions valid for parallel execution by the golden model and the processor system under test, where N equals 1 or more; and an instruction generator and simulator that generates and simulates instructions that correspond to said group of N instructions created by said instruction packer, evaluates the updated architectural state of the golden model, and updates said resource-related data structures.

2. The apparatus of claim 1, wherein said group of N instructions valid for parallel execution further comprises N instructions that do not utilize common system resources other than source registers of the golden model or the processor system under test.

3. The apparatus of claim 1, wherein said instruction packer creates said group of N instructions valid for parallel execution by selecting instructions from an instruction tree in said user preference queue, wherein said instruction packer iteratively creates a group of potentially valid instructions by eliminating instructions ineligible for selection, based upon information indicated by said resource-related data structures and the instruction grouping rules for the golden model and the processor system under test.

4. The apparatus of claim 3, wherein said group of N instructions further comprises at least a first instruction and a second instruction, wherein sad second instruction is selected from said group of potentially valid instructions, and wherein said second instruction further comprises an instruction that does not utilize the same system resources others than source registers utilized by said first instruction.

5. The apparatus of claim 1, wherein said instruction packer creates said group of N instructions valid for parallel execution by selecting instructions in one of the following ways: by selecting each instruction in the order that said instruction appears in an ordered instruction list in said user preference queue, or by selecting a "no operation" instruction where the next instruction in said ordered instruction list requires unavailable system resources or violates the processor groups rules.

6. A processor verification test system that uses a golden model to generate a test program that verifies that a processor system under test properly executes two or more instructions issued and executed in parallel, comprising:

a user preference queue that comprises queue entries wherein each queue entry further comprises an instruction to be tested, a group or tree of instructions to be tested, or a test generator control command;

a plurality of resource-related data structures, wherein each said resource-related data structure comprises information concerning selected system resources of the golden model, wherein said information comprises two or more of the following: actual past state, actual present state, actual future state, predicted past state, predicted present state, or predicted future state;

an instruction packer coupled to said user preference queue and said resource-related data structures, said instruction packer creates a group of N instructions valid for parallel execution by the golden model and the processor system under test, where N equals 1 or more; and an instruction generator and simulator that generates and simulates instructions that correspond said group of N instructions created by said instruction packer, evaluates the updated architectural state of the golden model, and updates said resource-related data structures.

7. The system of claim 6, wherein said group of N instructions valid for parallel execution farther comprises N instructions that do not utilize common system resources other than source registers of the golden model or the processor system under test.

8. The system of claim 6, wherein said instruction packer creates said group of N instructions valid for parallel execution by selecting instructions from an instruction tree in said use preference queue, wherein said instruction packer iteratively creates a group of potentially valid instructions by eliminating instructions ineligible for selection, based upon information indicated by said resource-related data structures and the instruction grouping rules for the golden model and the processor system under test.

9. The system of claim 8, wherein said group of N instructions further comprises at least a first instruction and a second instruction, wherein said second instruction is selected from said group of potentially valid instructions, wherein said second instruction further comprises an instruction that does not utilize the same system resources other than source registers that are utilized by said first instruction.

10. The system of claim 6, wherein said instruction packer creates said group of N instructions valid for parallel execution by selecting instructions in one of the following ways: by selecting each instruction in the order that said instruction appears in an ordered instruction list in said user preference queue, or by selecting a "no operation" instruction where the next instruction in said ordered instruction list requires unavailable system resources or violates the processor grouping rules.

11. A method that makes a processor verification test apparatus that uses a golden model to create a test program that verifies that a processor system under test properly executes two or more instructions issued and executed in parallel, comprising:
providing a user preference queue that comprises queue entries wherein each queue entry further comprises an instruction to be tested, a group or tree of instructions to be tested, or a test generator control command;
providing a plurality of resource-related data structures, wherein each said resource-related data structure comprises information concerning selected system resources of the golden model, wherein said information comprises two or more of the following: actual past state, actual present state, actual future state, predicted past state, predicted present state, or predicted future state;
coupling an instruction packer to said user preference queue and said resource-related data structures, said instruction packer creates a group of N instructions valid for parallel execution by the golden model and the processor system under test, where N equals 1 or more; and
coupling an instruction generator and simulator to said instruction packet and said resource-related data structures, said instruction generator and simulator generates and simulates instructions that correspond said group of N instructions created by said instruction packer, evaluates the updated architectural state of the golden model, and updates said resource-related data structures.

12. The method of claim 11, wherein said group of N instructions valid for parallel execution further comprises N instructions that do not utilize common system resources other than source registers of the golden model or the processor system under test.

13. The method of claim 11, wherein said instruction packer creates said group of N instructions valid for parallel execution by selecting instructions from an instruction tree in said user preference queue, wherein said instruction packer iteratively creates a group of potentially valid instructions by eliminating instructions ineligible for selection, based upon information indicated by said resource-related data structures and the instruction grouping rules for the golden model and the processor system under test.

14. The method of claim 13, wherein said group of N instructions further comprises at least a first instruction and a second instruction, wherein said second instruction is selected from said group of potentially valid instructions, wherein said second instruction further comprises an instruction that does not utilize the same system resources other than source registers utilized by said first instruction.

15. The method of claim 11, wherein said instruction packer creates said group of N instructions valid for parallel execution by selecting instructions in one of the following ways; by selecting each instruction in the order that said instruction appears in an ordered instruction list in said user preference queue, or by selecting a "no operation" instruction where the next instruction in said ordered instruction list requires unavailable system resources or violates the processor grouping rules.

16. A method that generates a test program that verifies that a processor system under test properly executes two or more instructions issued and executed in parallel, comprising:
filling a user preference queue with queue entries, wherein each queue entry further comprises an instruction to be tested, a group or tree of instructions to be tested, or a test generator control command;
generating a plurality of resource-related data structures, wherein each said resource-related data structure comprises information concerning selected system resources of the golden model, wherein said information comprises two or more of the following: actual past state, actual present state, actual future state, predicted past state, predicted present state, or predicted future state;
creating a group of N instructions valid for parallel execution by the golden model and the processor system under test, where N equals 1 or more, by selecting instructions from said queue entries based upon information within said resource-related data structures and the instruction grouping rules for the golden model and the processor system under test; and
generating and simulating instructions that correspond said group of N instructions, evaluating the updated architectural state of the golden model, and updating said resource-related data structures.

17. The method of claim 16, wherein said group of N instructions valid for parallel execution further comprises N instructions that do not utilize common system resources other than source registers of the golden model or the processor system under test.

18. The method of claim 16, wherein said group of N instructions valid for parallel execution is created by selecting instructions from an instruction tree in said user preference queue, and said method further comprises iteratively creating a group of potentially valid instructions by eliminating instructions ineligible for selection, based upon information within said resource-related data structures and the instruction grouping rules for the golden model and the processor system under test.

19. The method of claim 18, wherein said group of N instructions further comprises at least a first instruction and a second instruction, wherein said second instruction is selected from said group of potentially valid instructions, wherein said second instruction further comprises an instruction that does not utilize the same system resources other than source registers utilized by said first instruction.

20. The method of claim 16, wherein creating said group of N instructions valid for parallel execution further comprises selecting instructions in one of the following ways: selecting each instruction in the order that said instruction appears in an ordered instruction list in said user preference queue, or selecting a "no operation" instruction where the next instruction in said ordered instruction list requires unavailable system resources or violates the processor grouping rules.

21. A program storage device readable by a computer that tangibly embodies a program of instructions executable by the computer to perform a method that generates a test program that verifies that a processor system under test properly executes two or more instructions issued and executed in parallel, comprising:
  filling a user preference queue with queue entries, wherein each queue entry further comprises an instruction to be tested, a group or tree of instructions to be tested, or a test generator control command;
  generating a plurality of resource-related data structures, wherein each said resource-related data structure comprises information concerning selected system resources of the golden model, wherein said information comprises two or more of the following: actual past state, actual present state, actual future state, predicted past state, predicted present state, or predicted future state;
  creating a group of N instructions valid for parallel execution by the golden model and the processor system under test, where N equals 1 or more, by selecting instructions from said queue entries based upon information within said resource-related data structures and the instruction grouping rules for the golden model and the processor system under test; and
  generating and simulating instructions that correspond said group of N instruction evaluating the updated architectural state of the golden model, and updating said resource-related data structures.

22. The program storage device of claim 21, wherein said group of N instructions valid for parallel execution further comprises N instructions that do not utilize common system resources other than source registers of the golden model or the processor system under test.

23. The program storage device of claim 21, wherein said group of N instructions valid for parallel execution is created by selecting instructions from an instruction tree in said user preference queue, and said method further comprises iteratively creating a group of potentially valid instructions by eliminating instructions ineligible for selection, based upon information within said resource-related data structures and the instruction grouping rules for the golden model and the processor system under test.

24. The program storage device of claim 23, wherein said group of N instructions further comprises at least a first instruction and a second instruction, wherein said second instruction is selected from said group of potentially valid instructions, wherein said second instruction further comprises an instruction that does not utilize the same system resources other than source registers utilized by said first instruction.

25. The program storage device of claim 21, wherein creating said group of N instructions valid for parallel execution further comprises selecting instructions in one of the following ways: selecting each instruction in the order that said instruction appears in an ordered instruction list in said user preference queue, or selecting a "no operation" instruction where the next instruction in said ordered instruction list requires unavailable system resources or violates the processor grouping rules.

26. A processor verification test apparatus that uses a golden model to generate a test pro that verifies that a processor system under test properly executes two or more instructions issued and executed in parallel, comprising:
  a user preference queue that comprises queue entries wherein each queue entry further comprises an instruction to be tested, a group or tree of instructions to be tested, or a test generator control command;
  a plurality of resource-related data structures, wherein each said resource-related data structure comprises information concerning selected system resources of the golden model, wherein said information comprises two or more of the following: actual past state, actual present state, actual future state, predicted past state, predicted present state, or predicted future state;
  an instruction packer coupled to said user preference queue and said resource-related data structures, said instruction packer creates a group of instructions valid for parallel execution by the golden model and the processor system under test, wherein said N instructions do not utilize common system resources other than source registers of the golden model or the processor system under test and where N equals 1 or more, by selecting instructions in one of the following two ways: from an instruction tree in said user preference queue, wherein said instruction packer iteratively creates a group of potentially valid instructions by eliminating instructions ineligible for selection, based upon information indicated by said resource-related data structures and the instruction grouping rules for the golden model and the processor system under test, in which case said group of N instructions further comprises at least a first instruction and a second instruction, wherein said second instruction is selected from said group of potentially valid instructions, and wherein said second instruction further comprises an instruction that does not utilize the same system resources other than source registers utilized by said first instruction, or from an ordered instruction list in said user preference queue, wherein each instruction selected comprises either the next instruction in said ordered instruction list or a "no operation" instruction if said next instruction in said ordered instruction list requires unavailable system resources or violates the processor grouping rules;
  and an instruction generator and simulator that generates and simulates instructions that correspond to said group of N instructions created by said instruction packer, evaluates the updated architectural state of the golden model, and updates said resource-related data structures.

27. A processor verification test system that uses a golden model to generate a test program that verifies that a processor system under test properly executes two or more instructions issued and executed in parallel, comprising:
  a user preference queue that comprises queue entries wherein each queue entry further comprises an instruction to be tested, a group or tree of instructions to be tested, or a test generator control command;
  a plurality of resource-related data structures, wherein each said resource-related data structure comprises information concerning selected system resources of the golden model wherein said information comprises two or more of the following: actual past state, actual present state, actual future state, predicted past state, predicted present state, or predicted future state;

an instruction packer coupled to said user preference queue and said resource-related data structures said instruction packer creates a group of instructions valid for parallel execution by the golden model and the processor system under test, wherein said N instructions do not utilize common system resources other than source registers of the golden model or the processor system under test and where N equals 1 or more, by selecting instructions in one of the following two ways: from an instruction tree in said user preference queue, wherein said instruction packer iteratively creates a group of potentially valid instructions by eliminating instructions ineligible for selection, based upon information indicated by said resource-related data structures and the instruction grouping rules for the golden model and the processor system under test, in which case said group of N instructions further comprises at least a first instruction and a second instruction, wherein said second instruction is selected from said group of potentially valid instructions, and wherein said second instruction further comprises an instruction that does not utilize the same system resources other than source registers utilized by said first instruction, or from an ordered instruction list in said user preference queue, wherein each instruction selected comprises either the next instruction in said ordered instruction list or a "no operation" instruction if said next instruction in said ordered instruction list requires unavailable system resources or violates the processor grouping rules; and an instruction generator and simulator that generates and simulates instructions that correspond to said group of N instructions created by said instruction packer, evaluates the updated architectural state of the golden model, and updates said resource-related data structures.

28. A method that makes a processor verification test apparatus that uses a golden model to generate a test program that verifies that a processor system under test properly executes two or more instructions issued and executed in parallel, comprising:

providing a user preference queue that comprises queue entries wherein each queue entry further comprises an instruction to be tested, a group or tree of instructions to be tested, or a test generator control command;

providing a plurality of resource-related data structures, wherein each said resource-related data structure comprises information concerning selected system resources of the golden model, wherein said information comprises two or more of the following: actual past state, actual present state, actual future state, predicted past state, predicted present state, or predicted future state;

providing an instruction packer coupled to said user preference queue and said resource related data structures, said instruction packer creates a group of N instructions valid for parallel execution by the golden model and the processor system under test, wherein said N instructions do not utilize common system resources other than source registers of the golden model or the processor system under test and where N equals 1 or more, by selecting instructions in one of the following two ways: from an instruction tree in said user preference queue, wherein said instruction packer iteratively creates a group of potentially valid instructions by eliminating instructions ineligible for selection, based upon information indicated by said resource-related data structures and the instruction grouping rules for the golden model and the processor system under test, in which case said group of N instructions further comprises at least a first instruction and a second instruction, wherein said second instruction is selected from said group of potentially valid instructions, and wherein said second instruction further comprises an instruction that does not utilize the same system resources other than source registers utilized by said first instruction, or from an ordered instruction list in said user preference queue, wherein each instruction selected comprises either the next instruction in said ordered instruction list or a "no operation" instruction if said next instruction in said ordered instruction list requires unavailable system resources or violates the processor grouping rules; and providing an instruction generator and simulator that generates and simulates instructions that correspond to said group of N instructions created by said instruction packer, evaluates the updated architectural state of the golden model, and updates said resource-related data structures.

29. A method that uses a golden model to generate a test program that verifies that a processor system under test properly executes two or more instructions issued and executed in parallel, comprising:

filling a user preference queue that comprises queue entries wherein each queue entry further comprises an instruction to be tested, a group or tree of instructions to be tested or a test generator control command;

generating a plurality of resource-related data structures, wherein each said resource-related data structure comprises information concerning selected system resources of the golden model, wherein said information comprises two or more of the following: actual past state, actual present state, actual future state, predicted past state, predicted present state, or predicted future state;

creating a group of N instructions valid for parallel execution by the golden model and the processor system under test using an instruction packer coupled to said user preference queue and said resource-related data structures, wherein said N instructions do not utilize common system resources other than source registers of the golden model or the processor system under test and where N equals 1 or more, by selecting instructions in one of the following two ways: from an instruction tree in said user preference queue, wherein said instruction packer iteratively creates a group of potentially valid instructions by eliminating instructions ineligible for selection, based upon information indicated by said resource-related data structures and the instruction grouping rules for the golden model and the processor system under test, in which case said group of N instructions further comprises at least a first instruction and a second instruction, wherein said second instruction is selected from said group of potentially valid instructions, and wherein said second instruction further comprises an instruction that does not utilize the same system resources other than source registers utilized by said first instruction, or form an ordered instruction list in said user preference queue, wherein each instruction selected comprises either the next instruction in said ordered instruction list or a "no operation" instruction if said next instruction in said ordered instruction list requires unavailable system resources or violates the processor grouping rules; and generating and simulating instructions that correspond to said group of N instructions created by said instruction packer, evaluating the updated architectural state of the golden model, and updating said resource-related data structures.

30. A program storage device readable by a computer that tangibly embodies a program of instructions executable by the computer to perform a method that uses a golden model to generate a test program that verifies that a processor system under test properly executes two or more instructions issued and executed in parallel, comprising:

filling a user preference queue that comprises queue entries wherein each queue entry further comprises an instruction to be tested, a group or tree of instructions to be tested, or a test generator control command;

generating a plurality of resource-related data structures, wherein each said resource-related data structure comprises information concerning selected system resources of the golden model, wherein said information comprises two or more of the following: actual past state, actual present state, actual future state, predicted past state, predicted present state, or predicted future state;

creating a group of N instructions valid for parallel execution by the golden model and the processor system under test using an instruction packer coupled to said user preference queue and said resource-related data structures, wherein said N instructions do not utilize common system resources other than source registers of the golden model or the processor system under test and where N equals 1 or more, by selecting instructions in one of the following two ways: from an instruction tree in said user preference queue, wherein said instruction packer iteratively creates a group of potentially valid instructions by eliminating instructions ineligible for selection, based upon information indicated by said resource-related data structures and the instruction grouping rules for the golden model and the processor system under test, in which case said group of N instructions further comprises at least a first instruction and a second instruction, wherein said second instruction is selected from said group of potentially valid instructions, and wherein said second instruction further comprises an instruction that does not utilize the same system resources other than source registers utilized by said first instruction, or from an ordered instruction list in said user preference queue, wherein each instruction selected comprises either the next instruction in said ordered instruction list or a "no operation" instruction if said next instruction in said ordered instruction list requires unavailable system resources or violates the processor grouping rules; and generating and simulating instructions that correspond to said group of N instructions created by said instruction packer, evaluating the updated architectural state of the golden model, and updating said resource-related data structures.

* * * * *